UNITED STATES PATENT OFFICE.

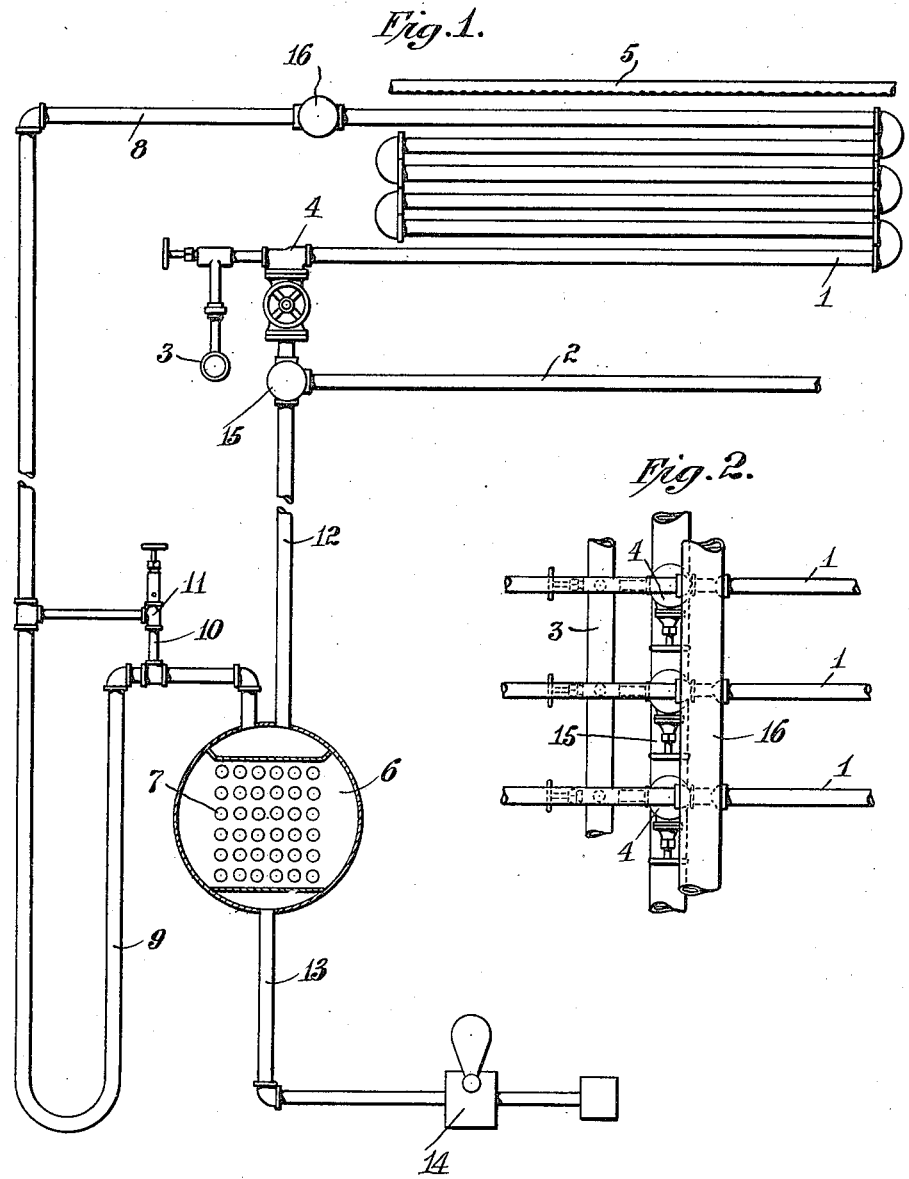

HENRY TORRANCE, OF NEW YORK, N. Y.

ABSORPTION APPARATUS.

1,311,627. Specification of Letters Patent. Patented July 29, 1919.

Application filed July 19, 1916. Serial No. 110,032.

*To all whom it may concern:*

Be it known that I, HENRY TORRANCE, a citizen of the United States of America, and a resident of New York, county of New York, and State of New York, have invented certain new and useful Absorption Apparatus, of which the following is a specification.

My invention relates to improvements in absorption systems, particularly those embodied in absorption refrigeration methods and apparatus, and comprises means for compensating for loss of pressure due to frictional resistance to flow through a primary absorber.

It has been discovered that by passing a mixture of weak liquor and gas (usually ammonia) to be absorbed in such liquor, through a pipe coil absorber at a very high rate of speed, the absorbing capacity per square foot of cooling surface of the absorber is very large; but owing to frictional losses due to such high rate of flow through the absorber, the pressure of the liquid, at the exit from the absorber, is considerably less than the pressure at entrance, as a result of which the percentage of gas to liquid in the final strong liquor is less than it would be if this discharge pressure were greater. In a particular case, the gas enters the absorber at fifteen pounds pressure and the weak liquor enters at the same or higher pressure, while the strong liquor issues at twelve pounds pressure. This loss of pressure from fifteen pounds to twelve pounds represents a loss in efficiency of about thirty per cent.

The object of my invention is to avoid this loss and to raise the pressure of the strong liquor issuing from the primary absorber, to a pressure at least as great as that at which the gas enters the primary absorber. Another object of my invention is to accomplish the above result by simple and inexpensive means.

I will now proceed to describe my invention with reference to the accompanying drawings, and will then point out the novel features in claims. In said drawings:

Figure 1 shows more or less diagrammatically an elevation and partial vertical section of absorption apparatus embodying my invention.

Fig. 2 is a fragmentary top view of a portion of such apparatus illustrating the fact that there may be a number of units such as shown in Fig. 1 connected in multiple.

In the drawings, numeral 1 designates a pipe coil absorber, which, in the construction shown, is of the up-flow type. 2 designates the conduit through which gas to be absorbed is supplied to the absorber, and 3 designates a conduit through which absorbing liquid (usually weak ammonia liquid) is supplied to the absorber. 4 designates the usual mixing injector, whereby the said weak liquor and the said gas are mingled and discharged into absorber 1. The construction of such injector being well known, it is not thought necessary to illustrate it in detail herein.

5 designates a spray pipe whereby cooling liquid may be caused to flow over the surface of the pipe coil 1.

6 designates a secondary absorber, (absorber 1 being a primary absorber) the secondary absorber being preferably, though not necessarily, of the flooded type, and hence comprising a shell adapted to contain weak liquor and gas, and provided with cooling pipes 7 through which a cooling medium may be circulated. This secondary absorber 6 is located at a level considerably below that of the primary absorber 1, in order that there may be a difference of hydrostatic head between the two absorbers, and, therefore, a greater pressure in secondary absorber 6 than at the outlet of primary absorber 1.

The upper or outlet end of primary absorber 1 is connected with the secondary absorber 2 by a conduit 8 containing a trap 9 of a height sufficient to prevent back flow from absorber 6; *i. e.*, of a height sufficient to seal the conduit 8 at the bottom. Preferably the two sides of this trap 9 are connected by a conduit 10 provided with an air valve 11, whereby foul gas may be discharged from the system. A gas conduit 12 connects the gas supply conduit 2 with the secondary absorber 6. Absorber 6 is provided with a discharge conduit 13, whereby the strong liquor may be drawn off, by means of a pump 14 or otherwise, and delivered as desired.

The operation of this apparatus is as follows:

Gas to be absorbed passing from the supply pipe 2 into the mixing injector 4, at say fifteen pounds pressure, encounters, in the injector, weak absorbing liquid supplied by conduit 3, at about say fifteen pounds or even higher pressure; the conditions of supply of gas and the liquid being such that the mixed gas and liquid are circulated through the pipe coil absorber 1 at very high velocity. As above stated, a pipe coil absorber operated at such high velocity has a very large absorbing capacity, per square foot of cooling surface, but owing to friction losses, the liquid issuing from such absorber loses pressure, the pressure at exit being considerably less than that at entrance. To compensate for this loss, the liquid discharged from the outlet of the primary absorber 1 is passed through the conduit 8 and trap 9 into the secondary absorber 6 located at a much lower level than that of absorber 1; and in this secondary absorber 6 the strong liquor from absorber 1 encounters gas supplied through conduit 12; and owing to the greater pressure existing in secondary absorber 6 than in primary absorber 1, further absorption takes place in this secondary absorber 6, with the result that the strong liquid discharged from the secondary absorber 6 is of much greater strength than that discharged from primary absorber 1.

As illustrated particularly in Fig. 2, there may be a number of primary absorption units 1, connected in multiple to a header 15 interposed between the gas supply line 2 and the gas supply line 12; and similarly such plurality of absorbers 1 will be connected in multiple to the weak liquor supply header 3, and the said absorbers 1 will discharge in multiple into a header 16 connected by conduit 8 with the secondary absorber 6.

What I claim is:—

1. Absorption apparatus comprising a constricted primary absorber, means for passing absorbing liquid and gas to be absorbed at high velocity through such absorber, a secondary absorber located at a lower level than the primary absorber, a conduit for conveying strong liquor of the primary absorber to the secondary absorber and a conduit for supplying gas to be absorbed to the secondary absorber, the difference in level of the two absorbers being such as to create a hydrostatic head compensating for loss of pressure between the inlet and the outlet of the primary absorber, the said conduit connecting the outlet of the primary absorber with the secondary absorber comprising a trap preventing back flow.

2. Absorption apparatus comprising a constricted primary absorber, means for passing absorbing liquid and gas to be absorbed at high velocity through such absorber, a secondary absorber located at a lower level than the primary absorber, a conduit for conveying strong liquor of the primary absorber to the secondary absorber and a conduit for supplying gas to be absorbed to the secondary absorber, the difference in level of the two absorbers being such as to create a hydrostatic head compensating for loss of pressure between the inlet and the outlet of the primary absorber, the said conduit connecting the outlet of the primary absorber with the secondary absorber comprising a trap preventing back flow through such conduit, and a by-pass around such trap provided with a discharge valve.

In testimony whereof I have signed this specification in the presence of a subscribing witness.

HENRY TORRANCE.

Witness:
D. A. DAVIES.